May 22, 1956
W. J. McINTYRE
2,746,621
SEED BOX LOADER FOR GRAIN DRILLS
Filed Dec. 27, 1954
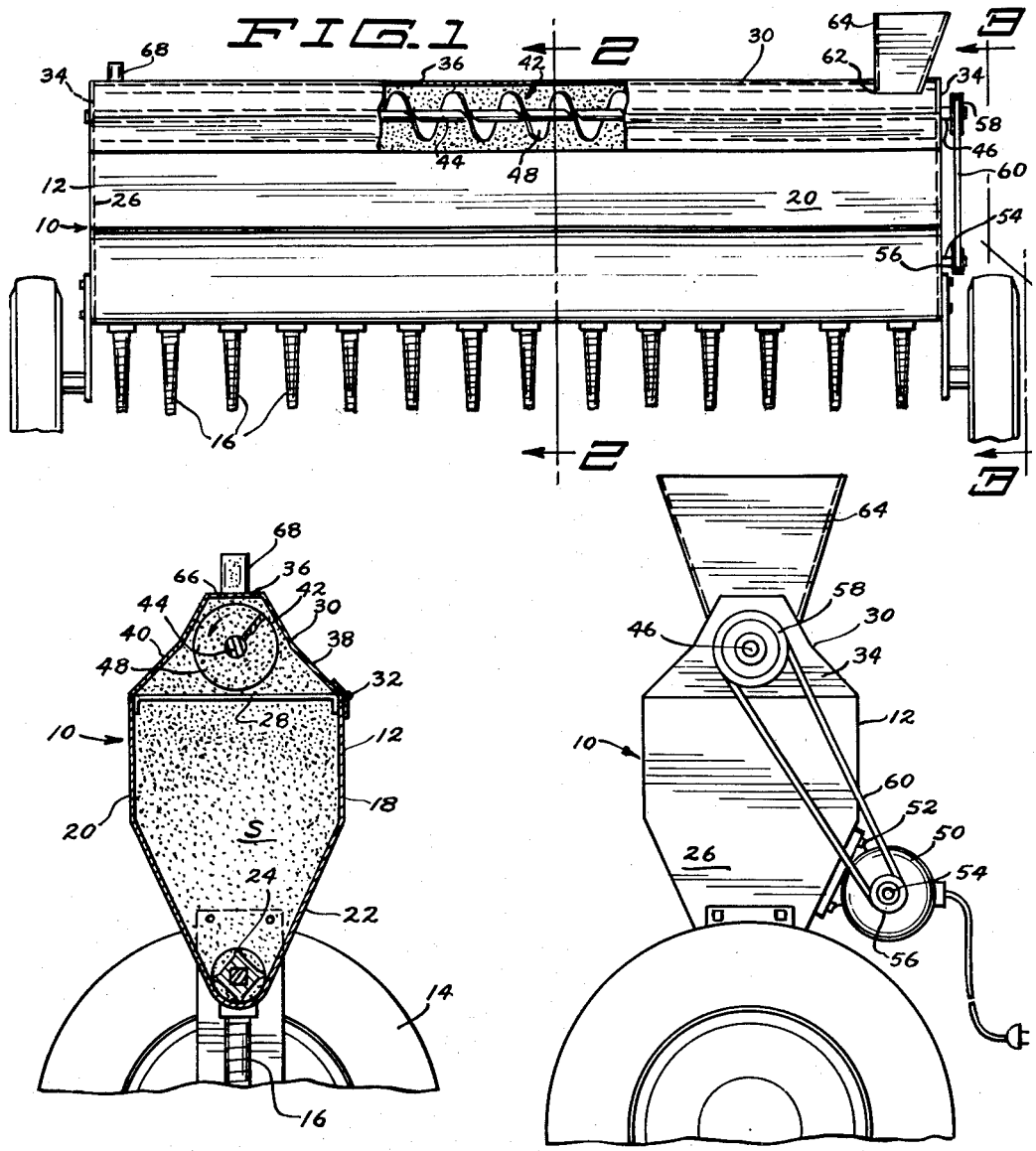
INVENTOR.
WILLIAM J. McINTYRE
BY
Carlsen & Hazle
ATTORNEYS United States Patent Office 2,746,621
Patented May 22, 1956

2,746,621

SEED BOX LOADER FOR GRAIN DRILLS

William J. McIntyre, Swift Current, Saskatchewan, Canada

Application December 27, 1954, Serial No. 477,675

4 Claims. (Cl. 214—83.32)

This invention relates generally to planting implements such as grain drills and the like having a single seed box and more particularly concerns a means for filling the box with seed.

It is a common practice for a drill operator about to undertake field planting to fill the seed box of the drill by shoveling seed from a truck box or like storage compartment. Inasmuch as the average seed box is long and narrow and has a normal capacity of many shovels or pails, the filling of the box in this manner is extremely laborious and time consuming. This is due to the fact that it is necessary to carry the seed to different places along the box and deposit it therein in order that the box may be filled to a uniform depth throughout its length. It is the purpose of the present invention to greatly reduce the manual labor required to fill the seed box by providing a construction wherein seed deposited at a single place in the box will be automatically distributed throughout the box.

The principal object of the invention is to provide a loading device for grain drills and the like which facilitates complete loading of the seed into the drill seed box at a single place along its length.

Another and more specific object of the invention is to provide a mechanism for planting devices adapted to distribute seed in an elongated seed box to a uniform depth throughout the length of the box.

Still another object of the invention is to provide a loading device for drill seed boxes which is permanently mounted on the seed box to operate on the contents thereof and yet which may be readily moved to an out of the way position to allow access to the box interior.

A still further object of the invention is to provide a device which serves as a combination cover and loading device for seed boxes used on planting implements.

A still further object of the invention is to provide a combination cover and seed filling device for grain drills and the like with means for signalling the operator that the filling operation has been completed.

Another object of the invention is to provide a device for loading implement seed boxes of the horizontally elongated type which will greatly reduce seed spillage and loss during the loading operation.

Another object of the invention is to provide a seed loading device for grain drills and the like which is readily adapted for use in combination with drills already in use without modification thereof.

With these and other objects in view my invention broadly comprises the providing of a cover for an elongated drill seed box, said cover having an opening at one end for the depositing of seed in the box, a conveyor mechanism disposed within the cover box enclosure to operate beneath the cover and uniformly distribute seed deposited through the opening throughout the length of the box, and means for driving the conveyor. The invention also provides for an overflow opening in the cover at the cover end remote from the deposit opening to allow the operator to readily ascertain the time at which the seed box has been completely and uniformly filled.

The above mentioned and still additional objects of the invention will be brought to light during the course of the following specification, reference being made to the accompanying drawing, in which—

Fig. 1 is a partial rear elevation of a grain drill with the seed box incorporating my improved box filling mechanism, and with the cover partially broken away to show the auger.

Fig. 2 is a vertical section through the box taken on line 2—2 of Fig. 1.

Fig. 3 is a side elevation showing the seed hopper and the auger drive means at one end of the box.

Referring now more particularly to the drawing reference numerals will be used to denote like parts and structural features in the different views. A grain drill of conventional construction is indicated generally by the numeral 10. The drill has an elongated seed box 12 mounted on transport wheels 14 with a plurality of longitudinally aligned and spaced seed tubes 16 depending from the box 12. The seed box has opposing front and rear walls respectively denoted at 18 and 20 which relatively converge at their lower portions to form a generally V-shaped pocket 22 along the lower part of the box and at the bottom of which there is disposed a series of rotary feeding devices 24 for feeding the seed S into the tubes 16 at the desired rate. End walls 26 are provided on the box 12 and the upper edges of the walls 18 and 20 are held in rigidly spaced relation by a series of cross braces 28 spaced along the length of the box between the end walls 26.

The structure of the seed box as thus far described is all relatively conventional in grain drills of this type. In filling such a box it has heretofore been necessary for the operator to deposit shovelfuls or pailfuls of seed at various places along the box and then manually distribute it equally throughout the length of the box so that the seed might be uniformly discharged through all of the devices 24 and tubes 16 until the box is emptied.

In carrying out my invention I provide the box 12 with a cover, indicated generally by the numeral 30, which meets the upper edges of the box walls to cover the box and which is hinged along one of its longer sides to the front or rear wall of the box for opening and closing movement. The cover is here shown hinged to the front wall 18 as by hinges 32. The cover has considerable depth and is in the general shape of an inverted trough having end walls 34 connected by a narrow top wall 36 and front and rear walls, denoted at 38 and 40 respectively, which relatively diverge in their downward extension to have their lower edges spaced equally apart with the walls 18 and 20 of the box so that the cover 30 fully covers the open top of the box.

The sides 38 and 40 of the cover member 30 break slightly inward along their centers in their downward extension whereby the upper portions of these walls, along with the top wall 36, form an inverted trough around the upper half of the screw conveyor or auger 42 to be shortly described. This trough may be formed in a half hexagon as shown or may be semi-circular to conform relatively closely to the outer periphery of the auger. The auger 42 has a center shaft 44 the ends of which are journaled in the end walls 34 of the cover for rotation of the shaft, one end of the shaft projecting outwardly as at 46 beyond the end wall. The shaft carries a spiral vane or screw flight 48 for moving seed longitudinally along the auger as it is rotated.

For rotating the auger I have shown an electric motor 50 which may be connected to the tractor battery or other power source and which is mounted on the front wall 18 of the box as at 52. The motor has a drive shaft 54 which carries a drive pulley 56. Shaft extension has a pulley wheel 58 keyed thereto which is driven through belt 60 from the pulley 56 to rotate the auger in the direction shown in Fig. 2. It will be understood that the auger vane 48 is so spiraled as to exert a force on material acted upon in a direction away from the extension 46 when rotated in the direction indicated. In the construction shown the auger has a right hand screw and the rotation is counter-clockwise or in a left hand direction when viewing from the right side of the drill for conventional auger action.

At one end of the planter, preferably the end carrying the auger drive means, the cover 30 is provided with a seed deposit opening 62 through which the seed S may be admitted to the box. A hopper extension 64 with upwardly diverging walls for guiding the seed through the opening 62 is mounted on the cover. At the opposite end of the cover the top wall 36 is provided with an overflow aperture 66 with a transparent tube 68 extending upwardly therefrom.

In operation my improvement serves to load the seed box quickly and uniformly. To fill the box the drill is moved adjacent to the seed storage bin or truck box as the case may be with the hopper 64 of the box as close as possible to the bin. The motor 50, or other drive means used, is put in operation to start rotation of the auger in the direction indicated. The seed S is then shoveled or otherwise conveyed into the hopper from which it slides through the opening 62 and into the box 12. The first few shovelfuls of seed deposited in the hopper will fall directly to the bottom of the box and pile up beneath the hopper opening being relatively unaffected in its path of descent by the rotating auger. As the seed then piles up to the auger level the auger will begin moving the top of the pile sidewardly along the box and this will continue until the entire box has been filled to the auger level. When the box has been filled the topmost seed will be moved the entire length of the box and there being no space in which it can be deposited, it will be forced out through the opening 66 and into the transparent tube 68 where it may be observed by the operator. When this occurs the operator has the knowledge that the box is filled and motor 50 is turned off and the deposit of seed in the hopper terminated.

While I have herein mentioned the shoveling of seed into the hopper 64, it may, of course, be deposited therein by other quicker and more automatic means such as an auxiliary auger, a bin spout, a blower on the truck box or the like and the auger 42 may be rotated at a more advanced speed for quicker loading and equal distributing effectiveness.

It will also be understood that while the auger 42 is here driven by the electric motor 50 it may also be operated from a tractor power take-off or through suitable transmission mechanism from the tractor hydraulic system.

A modification of the invention would lie in providing the hopper and seed deposit opening at the longitudinal center of the cover rather than at one end and using a two-way auger in combination therewith for moving the seed from the center of the box toward both ends simultaneously. It is also possible, as will be readily understood, to use other than an auger type conveyor in carrying out the invention. Belt and slat type conveyors moving across the top of the seed pile will operate effectively to distribute the seed along the box. However, the auger is preferred due to its simplicity of design and operation and its positive action upon the seed.

Still another modification coming within the scope of the present invention would be to mount the conveyor in an elongated rectangular frame adapted to be mounted on top of the seed box and which would serve as an upward extension of all four side walls of the box. The standard seed box cover or covers could then be attached for opening and closing over the frame in the same manner as designed for use on the seed box proper.

It will be noted in the preferred embodiment which I have shown in the drawing that the auger 42 lies entirely above the top plane of the box 12 so as to clear the cross braces 28 which are spaced along the box connecting the front and rear walls. With the auger mounted on the cover it is moved to an out of the way position when the cover is opened allowing access to the interior of the box for manual leveling of the seed or removing foreign particles therefrom if desired. This feature is particularly advantageous where it is desired to only partially load the box. In such case the amount of seed to be sown is deposited in the box through the hopper in the usual manner. While the auger will prohibit the opening 62 from clogging, the greater portion of the seed deposited will remain at the hopper end of the box. However, once it is loaded it is a simple matter for the operator to open the cover and distribute the seed manually throughout the length of the box.

The proximity and conformity of the upper portion of the cover to the auger enables the cover to function as an auger trough, withholding the seed against outward and upward escape from the longitudinal action of the auger. The cover is, of course, latched firmly down against the box at all times while the auger is in motion to prevent any seed from spilling to the ground during the loading operation.

The invention is of such a construction as to allow its independent manufacture and ready application to drilling machines presently in use. It is relatively light in weight so as not to require the provision of supplemental supporting members for the box. Furthermore, its simplicity allows a reasonable manufacturing cost, minimum upkeep, and little chance of breakage.

The invention accordingly economically and effectively carries out the aforementioned objectives. It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a planting implement having an elongated seeder box, a cover for the box, said cover having an opening adjacent one end for depositing seed in the box, a conveyor mechanism under the cover for moving grain deposited through the opening longitudinally through the box in a direction away from said opening, power means for driving the conveyor, and said cover having an overflow opening at its other end, said opening being surrounded with a transparent tube extending upwardly from the cover.

2. For use in combination with a planting implement having a horizontally elongated open top seed container, a container loading mechanism which comprises an elongated trough shaped cover adapted to be placed in inverted position over the box and in alignment therewith to cover the same and open downwardly into the box, said cover having a top wall and opposing end walls, a screw conveyor disposed within the cover trough and having its ends journaled for rotation in the end walls of the cover, the top wall of the cover having an opening over a portion of the conveyor for depositing seed in the box, one of the ends of the conveyor extending outwardly beyond the end wall in which it is journaled and carrying a pulley wheel on said extension, an electric motor having a drive pulley, and a belt for connecting the drive pulley to said pulley wheel.

3. For use in combination with a drilling implement having a horizontally elongated seed box with a plurality of seed discharge tubes spaced along the bottom thereof, a means for distributing seed horizontally in the box for uniform discharge through said discharge tubes, said means comprising a cover for the box, said cover having the shape of an elongated trough adapted to be placed in downwardly opening position over the box with the trough interior in open communication with the interior of the box, an elongated screw member disposed within the trough and mounted on the cover for rotation on its longitudinal axis, the upper portion of the cover being in closely spaced relation to and contoured generally around the top of the conveyor, and pulley means on the conveyor concentric with its rotary axis.

4. For use in combination with a drilling implement having a horizontally elongated seed box with a plurality of seed discharge tubes spaced along the bottom thereof, a means for distributing seed horizontally in the box for uniform discharge through said discharge tubes, said means comprising a cover for the box, said cover having the shape of an elongated trough adapted to be placed in downwardly opening position over the box with the trough interior in open communication with the interior of the box, an elongated screw member disposed within the trough and mounted on the cover for rotation on its longitudinal axis, the upper portion of the cover being in closely spaced relation to and contoured generally around the top of the conveyor, pulley means on the conveyor concentric with its rotary axis, said cover having an opening in its upper portion for depositing seed in the box, and a hopper device on the cover for guiding seed through said opening.

References Cited in the file of this patent
UNITED STATES PATENTS

| | | |
|---|---|---|
| 2,190,724 | McBride | Feb. 20, 1940 |
| 2,406,886 | McBean | Sept. 3, 1946 |
| 2,673,741 | Durand | Mar. 30, 1954 |
| 2,703,193 | Seltzer | Mar. 1, 1955 |

FOREIGN PATENTS

| | | |
|---|---|---|
| 698,091 | Great Britain | Oct. 7, 1953 |